Dec. 8, 1953   L. W. PETRY ET AL   2,661,546
PAPER MACHINERY
Filed June 14, 1951
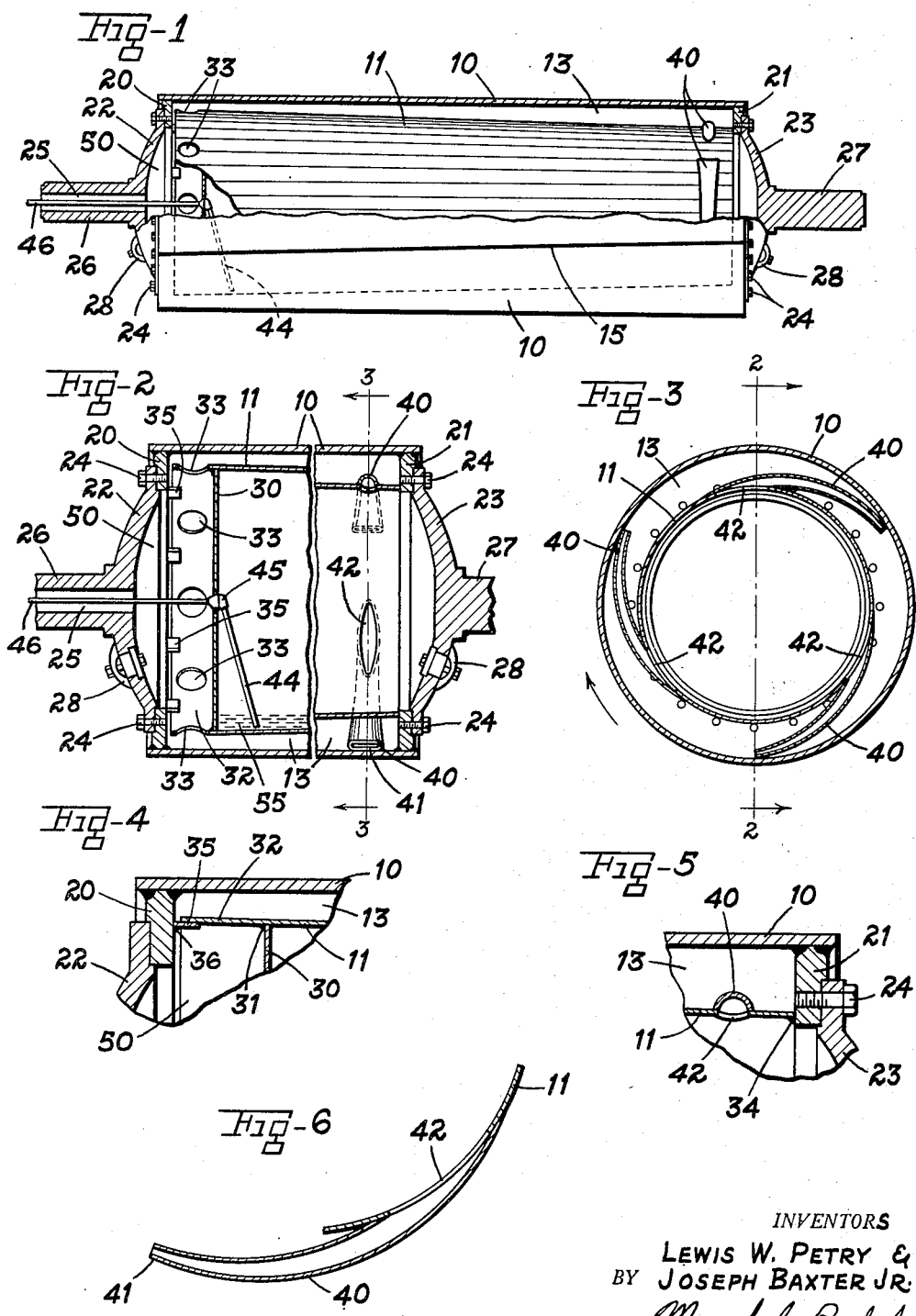
INVENTORS
LEWIS W. PETRY &
BY JOSEPH BAXTER JR.
Marechal & Biebel
ATTORNEYS Patented Dec. 8, 1953

2,661,546

UNITED STATES PATENT OFFICE 2,661,546

PAPER MACHINERY

Lewis W. Petry, Middletown, and Joseph Baxter, Jr., Franklin, Ohio, assignors to The Black-Clawson Company, Hamilton, Ohio, a corporation of Ohio Application June 14, 1951, Serial No. 231,543

9 Claims. (Cl. 34—124)

1

This invention relates to drier drums of the type used in paper manufacture to dry the newly formed paper web.

The invention has special relation to steam heated drier drums of the double-shell type, and one of the principal objects of the invention is to provide such a drier drum of simple, economical and comparatively lightweight construction which at the same time is of adequate strength for the steam pressure ranges normally employed and which in addition is highly efficient particularly from the standpoint of optimum transfer of heat from the steam to the outer shell.

This general objective is achieved in accordance with the invention in a drier drum of welded construction in which the inner and outer shells are so arranged that the flow of steam is channeled axially from one end to the other of the annular space between the shells and thence to the interior of the inner shell, with both surfaces of the inner shell thus being subjected to equal pressure conditions so that there is minimum stress thereon. Since therefore the inner shell serves primarily as a guide for the steam and is not subjected to differential pressures in use, it can be made of comparatively lightweight material providing overall lightness and economy of manufacture, and it may be readily mounted within the outer shell with one end supported for relative movement to compensate for differential expansion as required. In addition, provision is made for continuously collecting condensate from the annular space between the shells and for transferring it to the interior of the inner shell from which it may be siphoned out as desired, and this action is facilitated by constructing the inner shell in frusto-conical form such that the condensate is caused to collect at the larger end thereof for ready removal through the adjacent end of the drum, which may be readily accomplished by way of a siphon pipe extending through the same hollow journal through which the steam is initially admitted to the interior of the drum.

It is accordingly another object of the invention to provide a drier drum of the double-shell type in which the inner shell is supported in such relation to the outer shell as to serve primarily as a guide causing travel of the steam axially of the drum through the annular space between the two shells and in which the interior of the inner shell is at all times in open communication with this annular space to establish equal pressure conditions on both the inner and outer surfaces of the inner shell minimizing operating stresses thereon.

2

It is also an object of the invention to provide a drier drum as outlined above wherein the inner shell is generally frusto-conical in form and in which the liquid condensing in the annular space between the two shells is continuously transferred to the interior of the inner shell for collection by centrifugal force at the larger end of the inner shell to facilitate removal thereof.

Other objects and advantages of the invention will be apparent from the following description, the accompanying drawing and the appended claims.

In the drawing—

Fig. 1 is a view in side elevation, partly broken away, showing a drier drum constructed in accordance with the invention;

Fig. 2 is a sectional view of the drum approximately on the line 2—2 of Fig. 3;

Fig. 3 is a transverse section on the line 3—3 of Fig. 2; and

Figs. 4, 5 and 6 are enlarged fragmentary sections showing structural details of the drum.

Referring to the drawing, which illustrates a preferred embodiment of the present invention, the drier drum comprises an outer shell 10 and an inner shell 11 which cooperate to define an annular space 13 through which the steam is adapted to flow generally axially of the drum. The outer shell 10 may be advantageously formed of welded steel, preferably welded on a bias as shown at 15 to distribute stress and to give point contact along the seam with such doctoring devices as may be used with the drum. A head ring 20, 21 is welded within each end of the outer shell 10, and the roll heads 22 and 23 are secured to the head rings 20 and 21 as by bolts 24. The roll head 22 is provided with a hollow bore 25 in its journal portion 26 which forms the passageway for admitting steam to the interior of the drum in use, while the journal portion 27 of the roll head 23 is solid. Both roll heads are shown as provided with hand hole assemblies 28 of the usual type providing access to the interior of the drum for cleaning and the like.

The inner shell 11 is of relatively lightweight metal and is shown as generally frusto-conical, a taper of the order of 1° having been found satisfactory in a drum approximately ten feet in overall length. The larger end of the inner shell 11 is closed by means of a head plate 30 welded at 31 therewithin at a position spaced a short distance within the end of the shell, for example about six inches, leaving an annular flange portion 32 outwardly of this plate 30 which is provided with a plurality of openings 33 therethrough. The smaller end of the inner shell 11 is welded at 34 to the head ring 21 and cooperates therewith to close the adjacent end of the annular flow passage 13. The smaller end of the inner shell is accordingly fixed to the outer shell through this welded connection with the head ring 21, but the larger end of the inner shell terminates short of the head ring 20 to provide space for differential expansion, a clearance of the order of 3/8 inch having been found satisfactory. This end of the inner shell is supported on a plurality of lugs or ears 35 welded at 36 to the head ring 20 and projecting axially thereon to fit within the flange portion 32 on the inner shell.

A plurality of condensate sweeps 40 are provided adjacent the smaller end of the inner shell for collecting liquid condensing in the flow passage 13 and transferring this condensate to the interior of the inner shell. These sweeps are readily formed of a suitable pipe as show in Figs. 3 and 6 flattened at 41 to fit against the inner surface of the outer shell 10, and the inner end of each sweep is cut as shown to fit an elongated opening 42 in the inner shell, the radially inner end of each sweep being welded to the inner shell as shown. A siphon pipe 44 for removing condensate from the drum is provided at the larger end of the inner shell, the siphon pipe 44 being provided with a fitting 45 extending through the head plate 30 and having running clearance therewith. As shown, the siphon pipe 44 extends into closely spaced relation with the inner surface of the inner shell 11 adjacent its larger end, and the fitting 45 is equipped with a further pipe 46 extending outwardly through the bore 25 of roll head 20 for connection to the usual suction source.

In the operation of this drier drum, steam is admitted to the drum through the bore 25 and initially enters the chamber 50 defined between the roll head 20 and the plate 30. From this chamber, the steam flows through the openings 33, and also around the end of the flange 32, into the annular passage 13 between the two shells. Since the only outlet from this space 13 is by way of the condensate sweeps 40 to the interior of the inner shell, the steam is caused to flow through space 13 generally axially of the drum, and at the same time the flowing action of the steam will have a tendency to cause liquid condensing within space 13 to be urged towards the closed end of the space where it is picked up by the outer ends of the condensate sweeps 40. With the drum rotating as indicated by the arrow in Fig. 3, this condensed liquid is picked up by the sweeps and transferred to the interior of the inner shell, where centrifugal force causes it to flow to the larger end of the inner shell to form a puddle as indicated at 55 which is readily siphoned off by means of the siphon pipe 44.

It will accordingly be seen that this drum offers substantial advantages from the standpoint of simplicity of construction as well as practical advantages in use. For example, the inner shell functions primarily as a guide for the steam, and since its interior is at all times in open communication through the sweeps 40 with the space 13, both its inner and outer surfaces are subjected to the same pressure conditions. The inner shell is therefore not required to withstand the same unit pressures as the outer shell, and it is possible and practical to form the inner shell of comparatively lightweight material, thus greatly reducing both the weight and the cost of the drum as a whole. This also makes practical the construction of the inner shell in frusto-conical configuration as shown to facilitate collection and removal of condensed liquid in operation. Furthermore the general arrangement for the removal of condensate as described effects continuous and rapid removal of the condensate film along the inner surface of the outer shell, thus minimizing the insulating effect of this film and correspondingly increasing the effective heat transfer from the steam to the outer shell with resulting increased efficiency for the drum in use.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A drier drum of the character described comprising an outer shell, an inner shell within said outer shell and of smaller diameter providing an annular space therebetween, means for admitting steam to one end of said space for travel therethrough, means adjacent the other end of said space forming an open connection between said space and the interior of said inner shell to establish equal pressure conditions therein and to cause said steam to travel through said space generally axially of said drum, said connection means including a tubular member extending generally tangentially of said inner shell from a position adjacent the wall of said outer shell and said other end of said space to the interior of said inner shell for conveying condensate from said space to said inner shell in response to rotation of said drum, and means forming an outlet from the interior of said inner shell.

2. A drier drum of the character described comprising an outer shell, an inner shell within said outer shell and of smaller diameter providing an annular space therebetween, means for admitting steam to one end of said drum, means for directing said steam into one end of said annular space for travel therethrough generally axially of said drum, at least one tubular member extending generally tangentially of said inner shell from a position at the other end of said drum and adjacent the wall of said outer shell to the interior of said inner shell for transferring condensate from said annular space to the interior of said inner shell in response to rotation of said drum, said tubular member having both ends thereof open to form an open connection between said space and said inner shell establishing equal pressure conditions therein, and means for removing said condensate from said inner shell.

3. A drier drum of the character described comprising an outer shell, an inner shell within said outer shell and of smaller diameter providing an annular space therebetween, means securing one end of said inner shell in fixed relation with said outer shell to close the corresponding end of said annular space, means supporting the other end of said inner shell for movement with respect to said outer shell to compensate for differential expansion of said shells, means for admitting steam to said annular space at the end thereof adjacent said movable end of said inner shell, means adjacent the closed end of said space forming an open connection between said space and the interior of said inner shell to equalize pressure conditions therein and to cause travel of said steam through said space generally axially of said drum, means for transferring condensate from said space to said inner shell through said open connection, and means for removing said condensate from said inner shell.

4. A drier drum of the character described comprising an outer shell, an inner shell within said outer shell and of smaller diameter providing an annular space therebetween, means closing one end of said inner shell, means securing the other end of said inner shell in fixed relation with said outer shell to close the corresponding end of said annular space, means for admitting steam to the end of said drum adjacent said closed end of said inner shell, means for directing said steam into the end of said annular space adjacent said closed end of said inner shell, means adjacent said closed end of said space forming an open connection between said space and said shell to equalize pressure conditions therein and to cause said steam to travel through said space generally axially of said drum, and means forming an outlet from said inner shell.

5. A drier drum of the character described comprising an outer shell, an inner shell within said outer shell and of smaller diameter providing an annular space therebetween, means closing one end of said inner shell, means securing the other end of said inner shell in fixed relation with said outer shell to close the corresponding end of said annular space, means supporting said closed end of said inner shell in spaced relation with the adjacent end of said drum providing a chamber therebetween and providing for relative movement of said shells to compensate for differential expansion, means for supplying steam to said chamber for travel around said closed end of said inner shell to said annular space, means adjacent said closed end of said space forming an open connection between said space and the interior of said inner shell to establish equal pressure conditions therein and to cause said steam to travel through said space generally axially of said drum, and means forming an outlet from said inner shell.

6. A drier drum of the character described comprising an outer shell, an inner shell within said outer shell and of smaller diameter providing an annular space therebetween, means closing one end of said inner shell, means securing the other end of said inner shell in fixed relation with said outer shell to close the corresponding end of said annular space, means supporting said closed end of said inner shell in spaced relation with the adjacent end of said drum providing a chamber therebetween and providing for relative movement of said shell to compensate for differential expansion, means for supplying steam to said chamber for travel around said closed end of said inner shell to said annular space, means adjacent said closed end of said space forming an open connection between said space and the interior of said inner shell to establish equal pressure conditions therein and to cause said steam to travel through said space generally axially of said drum, means for transferring condensate from said space to the interior of said inner shell through said connection, and means for removing said condensate from said inner shell.

7. A drier drum of the character described comprising an outer shell, a generally frusto-conical inner shell within said outer shell and providing an annular space therebetween, means for admitting steam to the end of said space adjacent the larger end of said inner shell for travel through said space, means adjacent the smaller end of said inner shell forming an open connection between said annular space and the interior of said inner shell to establish equal pressure conditions therein and to cause said steam to travel through said space generally axially of said drum, said connection means including at least one tubular member extending from a position adjacent the wall of the outer shell to the interior of said inner shell for transferring condensate from said space to said inner shell in response to rotation of said drum for collection by centrifugal force adjacent said larger end of said inner shell, and means for removing said collected condensate from said inner shell.

8. A drier drum of the character described comprising an outer shell, an inner shell within said outer shell and of smaller diameter providing an annular space therebetween, means for admitting steam to one end of said drum, means for directing said steam into one end of said annular space for travel therethrough, means at the other end of said drum forming an open connection between said space and the interior of said inner shell to establish equal pressure conditions therein and to cause said steam to travel through said space generally axially of said drum, said connection means including at least one tubular member extending from a position adjacent the wall of the outer shell to the interior of said inner shell for transferring condensate from said space to the interior of said inner shell in response to rotation of said drum, said inner shell being generally frusto-conical to cause collection of said condensate therewithin adjacent the larger end thereof by centrifugal force, and means for removing said collected condensate from said inner shell.

9. A drier drum of the character described comprising an outer shell, a generally frusto-conical inner shell within said outer shell providing an annular space therebetween, means securing the smaller end of said inner shell in fixed relation with said outer shell to close the adjacent end of said annular space, means closing the larger end of said inner shell, means supporting said larger end of said inner shell in movable spaced relation with the adjacent end of said drum to compensate for differential expansion thereof and provide a chamber between said closed end of said inner shell and the adjacent end of said drum, means for admitting steam to said chamber, means for directing said steam around said closed end of said inner shell to the adjacent end of said annular space for travel therethrough, means forming an open connection between said annular space and said smaller end of said inner shell to establish equal pressure conditions therein and to cause said steam to travel through said space generally axially of said shell, means for transferring condensate from said space through said connection to the interior of said inner shell for collection by centrifugal force adjacent said closed end of said inner shell, and means for removing said collected condensate from said drum through said closed end of said inner shell.

LEWIS W. PETRY.
JOSEPH BAXTER, JR.

References Cited in the file of this patent

UNITED STATES PATENTS

| Number | Name | Date |
|---|---|---|
| 1,884,727 | Kermer | Oct. 25, 1932 |

FOREIGN PATENTS

| Number | Country | Date |
|---|---|---|
| 225,448 | Germany | Jan. 7, 1910 |